United States Patent [19]

Sakurai et al.

[11] 4,336,352

[45] Jun. 22, 1982

[54] BLEND OF THREE ETHYLENE POLYMERS

[75] Inventors: Hisaya Sakurai; Yoshihiko Katayama; Tadashi Ikegami; Shigeru Mizutani, all of Kurashiki, Japan

[73] Assignee: Asahi Kasei Kogyo Kabushiki Kaisha, Osaka, Japan

[21] Appl. No.: 176,739

[22] Filed: Aug. 11, 1980

[30] Foreign Application Priority Data

Aug. 24, 1979 [JP] Japan ................................. 54-107129

[51] Int. Cl.³ ...................... C08L 23/06; C08L 23/08; C08L 23/18
[52] U.S. Cl. ..................................... 525/240; 525/53; 525/210; 525/216; 525/232
[58] Field of Search ................. 525/53, 210, 216, 232, 525/240

[56] References Cited

U.S. PATENT DOCUMENTS

| | | | |
|---|---|---|---|
| 3,914,342 | 10/1975 | Mitchell | 525/53 |
| 3,969,470 | 7/1976 | Spiegelman | 525/53 |
| 4,048,412 | 9/1977 | Caumartin et al. | 525/53 |
| 4,098,974 | 7/1978 | Klaasen | 326/65 |

FOREIGN PATENT DOCUMENTS

| | | |
|---|---|---|
| 1031869 | 6/1966 | United Kingdom . |
| 1174542 | 12/1969 | United Kingdom . |
| 1233599 | 5/1971 | United Kingdom . |

OTHER PUBLICATIONS

Japanese Pat. Pub. No. 3215/70, Translated Claim (1970).
Japanese Pat. App. (laid-Open), No. 47079/1976, Translated Claim.

Primary Examiner—Stanford M. Levin
Attorney, Agent, or Firm—Sprung, Horn, Kramer & Woods

[57] ABSTRACT

A polyethylene composition comprising a mixture of three kinds of polyethylenes (A), (B) and (C) characterized in that:

(i) the viscosity average molecular weight of (A) is 1,000–100,000, the viscosity average molecular weight of (B) is 100,000–1,000,000, the viscosity average molecular weight of (C) is 400,000–6,000,000, the molecular weight ratio of (B) to (A), i.e. B/A, is 2–200 and the molecular weight ratio of (C) to (B), i.e. C/B, is 1.5 or more.
(ii) the mixing ratio of (A) to (B) is 30/70 to 70/30 and the mixing ratio of (C) is 1–10% by weight based on the total composition, and
(iii) the melt index of the composition is 0.001–1, and a process for producing said composition. This polyethylene composition is excellent in physical properties in that it has an appropriate die swell, a high melt tension and an excellent moldability and exhibits a high stiffness and a high ESCR.

7 Claims, 1 Drawing Figure

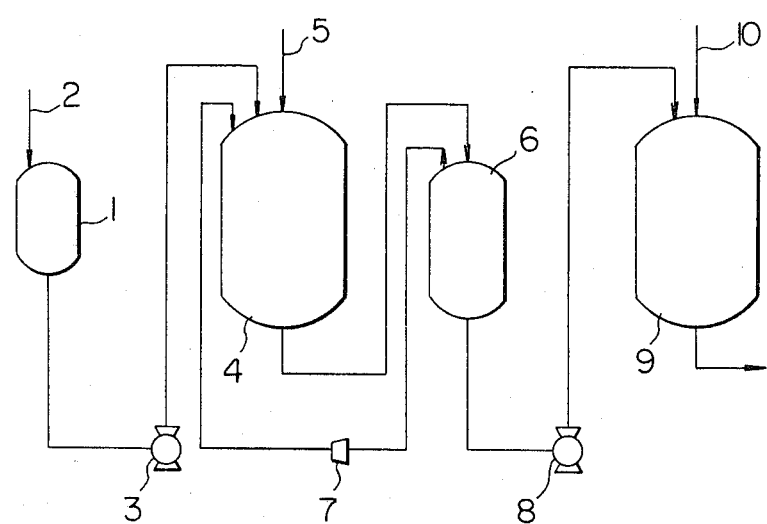

BLEND OF THREE ETHYLENE POLYMERS

This invention relates to a polyethylene resin composition having excellent physical properties and moldability, as well as to an ethylene polymerization process for producing said resin composition with a high productivity.

The characteristic properties of polyethylene required vary depending on the method of molding and use, and the characteristic properties of the polymer are designed so as to fit for them. That is, a polymer having a relatively low molecular weight and a narrow molecular weight distribution is suitable for articles to be molded by injection molding process, while a polymer having a relatively high molecular weight and a broad molecular weight distribution is used for articles to be molded by extrusion, namely blow molding or inflation molding process.

As a process for producing a polyethylene having a broad molecular weight distribution and used for extrusion molding, a number of processes are proposed.

As one of them, there is proposed a process which comprises melting and mixing together a high molecular weight polyethylene and a low molecular weight polyethylene produced elsewhere (Japanese Patent Publication No. 3,215/1970; Japanese Patent Publication No. 22,007/1970).

As another process, the multi-step polymerization process having two or more steps has been attempted (Japanese Patent Publication No. 11,349/1971; Japanese Patent Publication No. 42,716/1973; Japanese Patent Kokai (Laid-Open) No. 47,079/1976; Japanese Patent Kokai (Laid-Open) No. 19,788/1977).

The polymers produced by these processes have very excellent physical properties. That is, the polymers are superior to polymers produced by conventional processes in the balance of stiffness and environmental stress cracking resistance (ESCR), so that an article molded from the polymers exhibits sufficient strength and chemical resistance with a low thickness. Accordingly, a bottle molded by the use of this resin is lightweight and can sufficiently compete with conventional products in point of strength, so that its industrial value is quite high from the viewpoints of economizing resources and energies. Further, its high stiffness and good ESCR enable to use it under more severe conditions than ever and to give a product having a higher functionality than ever.

Though a polymer produced by the above-mentioned processes has excellent performances mentioned above, it also has the following faults. That is, it shows a lower die swell than conventional polyethylene, it shows a low melt tension, and it is inferior in moldability. When a molten polymer is extruded from the die of molding machine, a swelling occurs due to Barus effect. This is called die swell. In the case of blow molding, a bottle is formed from cylindrical molten polymer having a constant length (parison). Polyethylene molding makers use many kinds of polyethylene grades for the sake of manufacturing articles meeting the various requirements of market. Since the polyethylene produced by mixing high molecular weight and low molecular weight polyethylenes or by the multi-step polymerization process is lower than these polymers in die swell, a bottle molded from it has a low wall thickness and product having constant quality is difficult to obtain. Exchange of die is necessary to the control of wall thickness, which decreases productivity and necessitates spare dies. As above, a great difference in die swell brings about a great disadvantage industrially.

This invention provides a composition having good physical properties and capable of overcoming these faults, as well as a process for producing said composition.

Thus, this invention relates to a polyethylene composition comprising a mixture of three kinds of polyethylenes (A), (B) and (C) wherein:

(i) the viscosity average molecular weight of (A) is 1,000–100,000, the viscosity average molecular weight of (B) is 100,000–1,000,000, the viscosity average molecular weight of (C) is 400,000–6,000,000, the molecular weight ratio of B to A (B/A) is 2–100, and the molecular weight ratio of C to B (C/B) is 1.5 or more, (ii) the mixing ratio (A)/(B) is 30/70 to 70/30 and the mixing ratio of (C) in the composition is 1–10% by weight, and (iii) the composition has a melt index of 1 or less, as well as to a process for producing said composition.

According to this invention, there is provided a polyethylene composition having an extensive industrial applicability, having a controlled die swell, a high melt tension and an excellent moldability, exhibiting a high stiffness and a high ESCR, quite excellent in physical properties and suitable for blow molding.

The polyethylenes (A), (B) and (C) which are the constituents of this invention are homopolymers of ethylene or copolymers of ethylene and other olefins or dienes. As said other olefins and dienes used in the copolymerization, α-olefins such as propylene, butene, pentene, 4-methylpentene-1, hexene, octene, decene and the like, diolefins such as butadiene, isoprene and the like, and cycloolefins such as cyclopentene, cyclohexene, cyclopentadiene, norbornene and the like can be referred to.

Polyethylene (A) is the so-called high density polyethylene having an average molecular weight of 1,000–100,000 and preferably 5,000–70,000 and a density of 0.94–0.98.

Polyethylene (B) has an average molecular weight of 100,000–1,000,000 and preferable 300,000–800,000 and a density of 0.90–0.97.

The molecular weight ratio of (A) to (B) is 2–200 and preferably 5–100. If the molecular weight ratio is lower than 2, the excellent physical properties of this invention are difficult to obtain and the molecular weight distribution cannot be broad sufficiently so that the moldability becomes poor. On the other hand, if the molecular weight ratio exceeds 200, there is no advantage in improving physical properties and moldability and there is a disadvantage from the viewpoint of manufacture of the polymer.

Polyethylene (C) has an average molecular weight of 400,000–6,000,000 and preferably 600,000–4,000,000 and a density of 0.88–0.96.

The molecular weight ratio of (C) to (B) ((C)/(B)) is 1.5 or more and preferably 2 or more. If the molecular weight ratio is lower than 1.5 or the molecular weight of (C) is less than 400,000, the excellent physical properties of this invention are difficult to obtain and particularly the effect of enhancing the die swell and the effect of enhancing the melt tension and thereby improving the moldability, which are both the characteristic features of this invention, cannot be obtained. On the other hand, if the molecular weight of (C) exceeds 6,000,000, the uniformity of the composition is injured.

Next, the mixing ratios between constituents (A), (B) and (C) will be explained. The ratio of (A) to (B) is in the range of 30/70 to 70/30 and preferably 40/60 to 60/40. If the proportion of (A) or (B) exceeds 70%, excellent physical properties and moldability cannot be obtained.

The mixing ratio of constituent (C) in the composition is 1–10% by weight and preferably 3–8% by weight. By mixing it within this range, the die swell and the melt tension can be improved and a composition having good physical properties and moldability can be obtained. If the amount of component (C) mixed is small, no effect is obtained. If it exceeds 10%, the melt index of the final composition becomes too low so that the composition becomes poor in moldability and uniformity.

In mixing the three components (A), (B) and (C), (A), (B) and (C) may be mixed and kneaded simultaneously, or it is also allowable to previously mix any two of the three components and then mix and knead the third component therewith. Any of these two mixing methods may be employed. The mixing of these components is carried out under usual conditions in a molten state by using usual extruder or kneader. As said extruder, any of single screw type and double screw type may be used. As that of double screw type, CIM manufactured by, for example, The Japan Steel Works, Ltd., as well as FCM, DSM and the like manufactured by Farrel Co. may be used. As said kneader, Banbury mixer may be used, for example.

The composition thus produced has a melt index of 0.001–1 and preferably 0.005–0.5, a density of 0.976–0.935 and a molecular weight distribution of 60 or more and preferably 75 or more in terms of MIR, and it is a polymer suitable for extrusion molding.

The polyethylenes (A), (B) and (C) can be produced by the usual suspension polymerization, gas phase polymerization or solution polymerization using the low-pressure or medium pressure process. The catalyst used in the polymerization may be any catalyst, so far as it can produce the polyethylenes (A), (B) and (C). Industrially, however, such a high-activity catalyst comprising transition metal compound and organometallic compound as mentioned later and claimed in this application is preferable, because a step for removing the catalyst may be omitted in case using this catalyst.

In producing the composition of this invention, it is allowable to produce polyethylenes (A), (B) and (C) separately by the usual polymerization process and then mix them together as mentioned above. In order to more enhance the uniformity of the composition, however, it is preferable to produce the composition by a multi-step continuous polymerization comprising three or more steps.

Next, the production process by multi-step polymerization will be explained.

As the polymerization catalyst, catalysts comprising a transition metal compound and an organometallic compound are used, and those invented by the present inventors and mentioned in Japanese Patent Publication Nos. 36,788/1977, 36,790/1977, 36,791/1977, 36,792/1977, 50,070/1977, 36,794/1977, 36,795/1977, 36,796/1977, 36,915/1977, 36,917/1977 and 6,019/1978 and Japanese Patent Kokai (Laid-Open) Nos. 21,876/1975, 31,835/1975, 72,044/1975, 78,619/1975 and 40,696/1978 are effective. They comprise a solid catalyst component (A) and an organometallic compound (B), wherein said solid catalyst component (A) is obtainable by reacting the following (i) and (ii) or (i), (ii) and (iii):

(i) an organomagnesium compound represented by the following general formula:

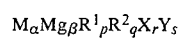

wherein $\alpha$ is a number equal to or greater than 0; $\beta$ is a number greater than 0; p, q, r and s are numbers equal to or greater than 0 and having the following relation:

$$p+q+r+s = m\alpha + 2\beta;$$

(m is the balance of M mentioned below) M is metallic element belonging to the I-III group of the periodic table; $R^1$ and $R^2$ are hydrocarbon groups having identical or different number of carbon atoms; X and Y, identical or different, represent halogen, $OR^3$, $OSiR^4R^5R^6$, $NR^7R^8$ or $SR^9$ wherein $R^3$, $R^4$, $R^5$, $R^6$, $R^7$ and $R^8$ represent hydrogen atom or hydrocarbon group and $R^9$ represents hydrocarbon group;

(ii) a titanium compound or a vanadium compound having at least one halogen atom;

(iii) a halide compound of Al, B, Si, Ge, Sn, Te or Sb. As said organometallic compound (B) compounds of the metals belonging to the I-III groups of the periodic table are used, among which complexes comprising organoaluminum compound and organomagnesium compound are particularly preferable.

The reaction between the catalyst component (A) and the organometallic compound component (B) can be carried out by adding both the components into the polymerization system and making it progress under the polymerization conditions with the progress of the polymerization, though it may also be carried out prior to the polymerization. The proportion of the catalyst components reacted is preferably in the range of 1–3,000 mmoles of (B) component per 1 g of (A) component. In place of catalyst component (A), a titanium compound supported on an inorganic magnesium compound may also be used.

The polymerization is carried out in a saturated hydrocarbon having 4–10 carbon atoms. The step for obtaining the high molecular weight polyethylene (C) having an average molecular weight of 400,000 or more may be any step of the multi-step polymerization. In order to obtain a high molecular weight, however, it is necessary that the concentration of molecular weight regulator (for example, hydrogen) is very low. Accordingly, it is advantageous to produce (C) in the first or last step of the polymerization as shown by the following scheme (a) or (b):

(C)-(B)-(A) or (C)-(A)-(B)     (a)

(A)-(B)-(C)     (b)

Hereunder, the procedure will be explained with reference to the case of first of all polymerizing (C), for the sake of simplifying the description.

For obtaining a high molecular weight polyethylene (C), the polymerization is carried out at a pressure of 0.5–20 kg/cm² G, preferably 0.5–10 kg/cm² G, and at a polymerization temperature of 30°–110°, preferably 40°–80° C., to obtain a polyethylene (C) satisfying the above-mentioned conditions. This polymerization for obtaining (C) may also be carried out by a batch process.

The polymerizations of the second and later steps are carried out at a polymerization temperature of 110° C. or below, preferably in the range of 60°–90° C., and at a polymerization pressure ranging from 1 to 30 kg/cm² G.

With reference to the drawing, a typical flow of this invention will be explained below in detail.

From line (2), ethylene, hexane, catalyst and the like are fed into polymerization apparatus (1) of the first step where the polymerization is carried out to give a high molecular weight polymer (C) having an average molecular weight of 400,000 or more. The slurry containing the high molecular weight polyethylene thus formed is introduced into the polymerization apparatus (4) of the second step by means of pump (3).

In the polymerization apparatus (4), ethylene, hexane, hydrogen, catalyst components etc. are fed from line (5) and polymerized to give low molecular weight polyethylene (A). The slurry in the polymerization apparatus (4) is led into flash drum (6) where the unreacted ethylene and hydrogen are removed. The ethylene and hydrogen removed are brought into a state of higher pressure by compressor (7) and returned to the polymerization apparatus (4). On the other hand, the slurry in the flash drum is introduced into polymerization apparatus (9) of the third step by pump (8).

In polymerization apparatus (9), ethylene, hexane, catalyst components etc. are fed from line (10) and polymerized to give high molecular weight polyethylene (B), whereby the molecular weight of the polymer is adjusted to the intended ultimate value. The polymer in the polymerization apparatus (9) is after-treated and then withdrawn as a product.

The flow explained above is one of the typical examples of this invention, and it is also allowable, if necessary, to produce high molecular weight polyethylene (B) in polymerization apparatus (4) and low molecular weight polyethylene (A) in polymerization apparatus (9). In this case flash drum (6) can be omitted. It is also allowable to circulate the content of the polymerization apparatus of later step, i.e. (9), into the preceding polymerization apparatus, i.e. (4).

according to such a flow sheet, the polymerization is carried out continuously and a polymer having good physical properties can be obtained.

The polymerization of this invention is not limited to homopolymerization of ethylene but it may also be a copolymerization of ethylene and 0.5–20% by mole of other olefin such as propylene, butene, 4-methylpentene-1, hexene, octene, butadiene, isoprene or the like. By these copolymerizations, polymers having respective characteristic features in physical properties can be obtained.

As is apparent from the description given above and the examples mentioned later, the characteristic feature of this invention consists in the following points. Thus, in the first place, this invention gives a polyethylene composition having an extensive industrial applicability, a controlled die swell, a broad molecular weight distribution and a high stiffness, exhibiting a high ESCR, quite excellent in physical properties and suitable for blow molding. In the second place, such a composition can be obtained with a high productivity by a continuous polymerization. In the third place, this invention provides a method for controlling the die swell of polymer for blow molding by means of a continuous polymerization and a method for enhancing melt tension and thereby improving moldability.

Hereunder, this invention will be illustrated in more detail by way of examples, but the invention is by no means limited by these examples.

The meanings of the symbols used in the examples and comparative examples and the conditions of the measurements therefor are as follows:

(i) MI: It expresses melt index. It was measured according to ASTM D-1238 at a temperature of 190° C. under a load of 2.16 kg.

(ii) MIR: It means the quotient obtainable by dividing the value of MI measured under the conditions of MI measurement under a high load of 21.6 kg with the value of MI of the above-mentioned paragraph (i). It is a measure of molecular weight distribution. Its higher value means a broader molecular weight distribution.

(iii) Molecular weight ($M_w$): $M_w$ was determined from intrinsic viscosity [$\eta$] measured in decalin at 135° C. and according to the following equation:

$$[\eta] = 6.8 \times 10^{-4} M_w 0.67$$

which is mentioned in Journal of Polymer Science, 36, 91 (1957).

(iv) Density: Real density measured according to ASTM D-1505.

(v) ESCR: It indicates environmental stress cracking resistance. It is measured by introducing a nonionic surfactant into a 500 ml bottle (weight 42 g, wall thickness 0.8 mm) molded by means of a 50$\phi$ blow molding machine at a cylinder temperature of 160° C. and a die temperature of 40° C. so as to fill up 10% of the inner volume, placing the bottle in an oven kept at 60° C. and applying a constant inner pressure. ESCR is expressed by the length of time required for breaking 50% of the tested bottles.

(vi) Die swell: It is expressed by the weight of parison, per 20 cm, extruded at a temperature of 170° C. by the use of a blow molding die having an outer diameter of 16 mm and an inner diameter of 10 mm.

EXAMPLE 1

(a) Synthesis of Catalyst

An organoaluminum-magnesium complex having a composition, AlMg$_6$(C$_2$H$_5$)$_3$($\eta$-C$_4$H$_9$)$_{12}$ was synthesized by introducing 138 g of di-n-butylmagnesium and 19 g of triethylaluminum together with 2 liters of n-heptane into a stirring tank having a capacity of 4 liters and allowing to react at 80° C. for 2 hours. After moisture and oxygen had been removed by substitution with dry nitrogen, 800 ml of a n-heptane solution containing 400 mmoles (54 g) of this complex was reacted with 800 ml of a n-heptane solution containing 400 mmoles of titanium tetrachloride at −20° C. for 4 hours with stirring. The resulting hydrocarbon-insoluble solid was isolated and washed with n-heptane to obtain 106 g of a solid.

The solid thus obtained was diluted with n-hexane and used for polymerization.

(b) Production of Polyethylene

By using a stainless made polymerization apparatus (9) having a reaction volume of 200 liters, polyethylene was produced by continuous polymerization. The polymerization was controlled at a polymerization temperature of 86° C. and a polymerization pressure of 12 kg/cm² G. As catalyst, triethylaluminum was introduced at a concentration of 0.5 mmole/liter. A solid catalyst was also introduced at a rate of about 3.5 g/hour together with hexane at a rate of 30 liters/hour so as to give a polymer formation of 8 kg/hour. Hydrogen, having a concentration of about 75%, was used as a molecular weight regulator. Thus, polyethylene (A) having a molecular weight of 25,000 was obtained. The catalytic effect was 110,000 g polymer/g-Ti.

Polyethylene (B) was produced under the same conditions as in polyethylene (A), except that concentration of hydrogen was about 15% and solid catalyst was fed at a rate of about 0.5 g/hour. As the result, polyethylene (B) having a molecular weight of 320,000 was obtained. The catalytic effect was 780,000 g polymer/g-Ti.

Polyethylene (C) was produced under the same conditions as in polyethylene (A), except that concentration of hydrogen was about 2%, the pressure was 8 kg/cm² G, the polymerization temperature was 73° C. and the solid catalyst was fed at a rate of about 0.4 g/hour. As the result, polyethylene (C) having a molecular weight of 1,000,000 was obtained. The catalytic effect was 970,000 g polymer/g-Ti.

(c) Production of Polyethylene Composition

The polyethylenes (A) and (B) produced in (b) were mixed together at a ratio of 50:50, to which was added 5% by weight of polyethylene (C). The mixture was kneaded together with 1,000 ppm of Irganox 1076 and 1,000 ppm of calcium stearate and extruded at 190° C. by means of an extruder of 40 mmφ to give pellets. Characteristic properties of this composition are shown in Table 1. The composition exhibits good physical properties in that ESCR and stiffness are well balanced and die swell is also high.

EXAMPLE 2

A composition was produced by multi-step continuous polymerization using the same catalyst as in Example 1.

Thus, into polymerization apparatus (1) having an inner volume of 20 liters, the same solid catalyst as in Example 1 was fed at a rate of 1.3 mmoles (based on Ti atom)/hour and triethylaluminum was fed at a rate of 20 mmoles (based on metallic atom)/hour. Also, purified hexane was fed at a rate of 40 liters/hour and ethylene was fed into polymerization apparatus (1) at a rate of about 1.0 NM³/hour. Polymerization was carried out by adjusting the conditions of polymerization apparatus (1) to a polymerization temperature of 60° C. and a pressure of 3 kg/cm² G, whereby polyethylene (C) was obtained. The polymer slurry formed by this polymerization was brought into a state of elevated pressure with slurry pump (3) and introduced into polymerization apparatus (4) having an inner volume of 300 liters at a pressure of 15 kg/cm² G and a temperature of 85° C. Into the polymerization apparatus (4), ethylene was introduced at a rate of 7 NM³/hour and hydrogen was introduced at a rate of 0.25 NM³/hour, and polymerization was carried out to give polyethylene (A). The polymer slurry in the polymerization apparatus (4) was led to flash drum (6) having a pressure of 1 kg/cm² G and a temperature of 75° C. where unreacted ethylene and hydrogen were separated. Then the slurry was brought into a state of elevated pressure and introduced into polymerization apparatus (9) by means of slurry pump (8). Polymerization apparatus (9) was kept at a temperature of 73° C. and a pressure of 8 kg/cm² G, to which purified n-hexane, triethylaluminum, ethylene, hydrogen and butene were fed at rates of, respectively, 40 liters/hour, 20 mmoles/hour, 7.2 NM³/hour, 0.02 NM³/hour and 17 mmoles/hour to produce polyethylene (B). The capacity of polymerization apparatus (9) was 200 liters.

After the three steps of polymerization were carried out as above, the polymer taken out from polymerization apparatus (9) had a melt index of 0.3, and other physical properties of this polymer were good similarly to Example 1, as shown in Table 1. The surface of the molded bottle was better than that obtained in Example 1 and more improved in uniformity. The polyethylene formed in polymerization apparatus (1) had an average molecular weight of about 2,000,000 and the proportion of its formation to the total formation (the sum of formation in polymerization apparatuses (1), (4) and (9)) was 6%.

The molecular weight of polymer (A) polymerized in the polymerization apparatus of the second step and the molecular weight of polymer (B) polymerized in the polymerization apparatus of the third step were determined by measuring MI of the polymers leaving respective polymerization apparatuses, estimating the MI values of the polymers formed in respective polymerization apparatuses from the following relation:

$$MI_t^{-0.175} = xMI_x^{-0.175} + yMI_y^{-0.175}$$

$$x + y = 1$$

(Journal of Polymer Science, Part A, 2, 2977–3007 (1964)) and determining their molecular weights from the actually measured relationship between MI and η, wherein:

x, y: weight fractions of polymer formation velocity in respective polymerization apparatuses, $MI_t$: melt index of the final polymer which has passed the two polymerization apparatuses, $MI_x$: melt index in the polymerization apparatus x, and $MI_y$: melt index in the polymerization apparatus y.

That is, $MI_g$ is determined from the observed values of $MI_t$ and $MI_x$.

Molecular weights of the polymers of the second and third steps were 21,000 and 260,000, respectively, as determined by the above-mentioned procedure.

EXAMPLE 3

Polymerization was carried out in the same manner as in Example 2 with the same catalyst as in Example 1, provided that the polymerization conditions of the third step for making polyethylene (B) were the same as in Example 2 except that the temperature was 65° C. and hydrogen was fed at a rate of 0.01 NM³/hour.

The polymer obtained by this polymerization had a MI of 0.04. Other physical properties of this polymer are shown in Table 1.

EXAMPLE 4

In the same manner as in Example 1, the polyethylenes (A) and (B) obtained in Example 1 were mixed together at a ratio of 45:55, to which was added 3% of the polyethylene (C) obtained in Example 1. Together with additives, the mixture was kneaded and extruded to give pellets. Characteristic properties of this composition are shown in Table 1.

COMPARATIVE EXAMPLE 1

A polyethylene having a MI value of 0.3 was produced by one step polymerization by using the same catalyst as in Example 1. Characteristic properties of this polyethylene are shown in Table 1. It has a low MIR and is very poor in moldability. Further, it exhibits a low ESCR and a low die swell.

were added to the mixture, from which pellets were made. The results are shown in Table 1. Though ESCR and MIR are both high, the rise in die swell is very small.

TABLE 1

| No. | MI | MIR | Density | ESCR | Swell ratio | Molecular weight of (C) | Molecular weight of (C)/molecular weight of (B) | Weight fraction of (C) (%) |
|---|---|---|---|---|---|---|---|---|
| Example 1 | 0.27 | 95 | 0.962 | 24 | 41 | 1,000,000 | 3.1 | 5 |
| Example 2 | 0.30 | 95 | 0.961 | 25 | 46 | 2,000,000 | 7.7 | 6 |
| Example 3 | 0.04 | 180 | 0.958 | 103 | 43 | 2,000,000 | 3.2 | 6 |
| Example 4 | 0.25 | 92 | 0.961 | 24 | 40 | 1,000,000 | 3.1 | 3 |
| Comparative Example 1 | 0.30 | 45 | 0.962 | 4 | 37 | — | — | — |
| Comparative Example 2 | 0.28 | 90 | 0.962 | 24 | 36 | — | — | — |
| Comparative Example 3 | 0.31 | 91 | 0.961 | 22 | 36 | — | — | — |
| Comparative Example 4 | 0.34 | 94 | 0.962 | 25 | 37 | 430,000 | 1.3 | 6 |

COMPARATIVE EXAMPLE 2

Polyethylenes (A) and (B) were produced by repeating the procedure of Example 1, provided that the polyethylene (B) had a molecular weight of 400,000. The two components (A) and (B) were mixed together at a ratio of 50:50. The same additives as in Example 1 were added to the mixture, from which pellets were made.

The results are shown in Table 1. Though the composition has a high ESCR and a high MIR, it has a low die swell.

COMPARATIVE EXAMPLE 3

By using the same catalyst as in Example 1, polymerizations corresponding to the second and third steps of Example 2 were practised without practising the superhigh molecular weight polymerization of the first step of Example 2.

A polymerization corresponding to the second step of the polymerization of Example 2 was practised in the first step and a polymerization corresponding to the third step of the polymerization of Example 2 was practised in the second step. The polymerization conditions in the first step were nearly the same as in the second step of Example 2, and the polymer obtained had a molecular weight of 21,000. The polymerization conditions in the second step were nearly the same as in the third step of Example 2, except that the feed of hydrogen was approximately zero. The polymer obtained had MI of 0.31. Its physical properties are shown in Table 1. As seen, it exhibits a low die swell though it shows a good balance between ESCR and stiffness.

COMPARATIVE EXAMPLE 4

Polyethylenes (A), (B) and (C) were produced in the same manner as in Example 1, except that polyethylene (C) had a molecular weight of 430,000, components (A) and (B) were mixed together at a ratio of 50:50 and (C) was added thereto in a proportion of 6% based on the total composition. The same additives as in Example 1

What is claimed is:

1. A composition comprising a mixture of three polymers (A), (B) and (C) which are selected from the group consisting of homopolymers of ethylene and copolymers of ethylene with a member selected from the group consisting of propylene, butene, pentene, 4-methylpentene-1, hexene, octene, and decene, the composition being characterized in that:
   (i) the viscosity average molecular weight of (A) is 1,000–100,000, the viscosity average molecular weight of (B) is 100,000–1,000,000, the viscosity average molecular weight of (C) is 400,000–6,000,000, the molecular weight ratio of (B) to (A), (B/A), is 2–200, and the molecular weight ratio of (C) to (B), (C/B), is 1.5 or more,
   (ii) the mixing ratio of (A) to (B), (A/B), is 30/70 to 70/30 and the mixing ratio of (C) to the total composition is 1–10% by weight,
   (iii) melt index of the composition is 0.001–1, and
   (iv) density of the composition is 0.976–0.935.
2. A composition according to claim 1, wherein melt index of the composition is 0.005–0.5.
3. A composition according to claim 1, wherein the viscosity average molecular weight of (C) is 600,000–4,000,000.
4. A composition according to claim 1, wherein the viscosity average molecular weight of (A) is 5,000–70,000, the viscosity average molecular weight of (B) is 300,000–800,000 and the molecular weight ratio of (B) to (A), (B/A), is 5–100.
5. A composition according to claim 1, wherein the molecular weight ratio of (C) to (B), (C/B), is 2 or more.
6. A composition according to claim 1, wherein the mixture ratio of (C) is 3–8% by weight based on the total composition.
7. A composition according to claim 1, wherein each of (A), (B) and (C) is a homopolymer of ethylene.

* * * * *